(12) United States Patent
Kim et al.

(10) Patent No.: US 9,606,617 B2
(45) Date of Patent: Mar. 28, 2017

(54) DISPLAY APPARATUS

(71) Applicant: SAMSUNG ELECTRONICS CO., LTD., Suwon-si (KR)

(72) Inventors: Go-hyun Kim, Yongin-si (KR); Hak-young Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 114 days.

(21) Appl. No.: 14/177,649

(22) Filed: Feb. 11, 2014

(65) Prior Publication Data

US 2014/0240219 A1    Aug. 28, 2014

(30) Foreign Application Priority Data

Feb. 27, 2013 (KR) .................. 10-2013-0021459

(51) Int. Cl.
    *G06F 3/01*        (2006.01)
    *G06F 3/00*        (2006.01)
    *G06F 3/03*        (2006.01)

(52) U.S. Cl.
    CPC .............. *G06F 3/005* (2013.01); *G06F 3/017* (2013.01); *G06F 3/0304* (2013.01)

(58) Field of Classification Search
CPC combination set(s) only.
See application file for complete search history.

(56) References Cited

U.S. PATENT DOCUMENTS

| | | | |
|---|---|---|---|
| 2007/0001071 A1* | 1/2007 | Yeh | .............. F16M 13/02 248/179.1 |
| 2011/0157009 A1 | 6/2011 | Kim et al. | |
| 2012/0127257 A1 | 5/2012 | Lu et al. | |
| 2012/0127362 A1 | 5/2012 | Chang | |
| 2012/0257064 A1 | 10/2012 | Kim et al. | |

FOREIGN PATENT DOCUMENTS

| | | |
|---|---|---|
| EP | 2768219 A2 | 8/2014 |
| KR | 10-2000-0020511 | 4/2000 |
| KR | 10-2007-0080063 | 8/2007 |
| KR | 10-0788865 | 12/2007 |
| KR | 10-2011-0076458 | 7/2011 |
| WO | 2012/115307 | 8/2012 |

OTHER PUBLICATIONS

Extended European Search Report dated Jan. 16, 2015 in corresponding European Patent Application No. 14155637.3.

(Continued)

*Primary Examiner* — Van Chow
(74) *Attorney, Agent, or Firm* — Staas & Halsey LLP

(57) ABSTRACT

A display apparatus and/or the method using the same which provide user interaction are provided. The display apparatus includes: a display body including an image display surface; and a photographing unit including a camera module to photograph a user to sense a user's gesture, and placed in a first position in which the photographing unit is accommodated in the display body when the photographing unit does not photograph, and placed in a second position in which the photographing unit protrudes out of the display body when the photographing unit photographs.

20 Claims, 14 Drawing Sheets

(56) References Cited

OTHER PUBLICATIONS

PCT International Search Report and Written Opinion of the International Searching Authority mailed May 8, 2014 in corresponding International Patent Application No. PCT/KR2014/000650.
European Examination Report dated Jan. 11, 2016 issued in corresponding European Patent Application 14 155 637.3.
Mexican Office Action dated Jul. 8, 2016 in corresponding Mexican Patent Application No. MX/a/2015/011017.
European Examination Report issued Nov. 11, 2016 in corresponding European Patent Application No. 14 155 637.3, 4 pages.

* cited by examiner

DISPLAY APPARATUS

CROSS-REFERENCE TO RELATED APPLICATIONS

This application claims priority benefit from Korean Patent Application No. 10-2013-0021459, filed on Feb. 27, 2013 in the Korean Intellectual Property Office, the disclosure of which is incorporated herein by reference in its entirety.

BACKGROUND

1. Field

Apparatuses and methods consistent with exemplary embodiments relate to a display apparatus, and more particularly, to a display apparatus which can perform user interaction.

2. Description of the Related Art

As the smart interactive function has been expanded in recent years, display apparatuses capable of performing user interaction have come into the markets. Such display apparatuses are essentially equipped with a photographing unit to sense a user's motion or a voice sensing unit to sense a user's voice, and the operation of the display apparatus is controlled according to the sensed user's motion or voice.

It is common that the related-art display apparatus has the photographing unit or the voice sensing unit fixed on an upper end of the display apparatus to perform user interaction. In this case, the upper end of the display apparatus protrudes out due to the presence of the photographing unit or voice sensing unit and thus the display apparatus does not show good appearance. Also, the user may feel like he/she is always under observation since the photographing unit or the voice sensing unit is exposed to view.

In order to address these shortcomings, the photographing unit or the voice sensing unit may be mounted in the display apparatus to be slidable up and down. Therefore, the photographing unit or the voice sensing unit is exposed only when they are in use and accommodated in the display apparatus when they are not in use.

In the case of the photographing unit, the photographing unit upwardly protrudes out from the display apparatus when it photographs, and downwardly slides, is accommodated in the display apparatus, and is not exposed to view when it does not photograph.

The photographing unit, which is vertically slidable as described above, should be moved up from the upper end of the display apparatus by more than a predetermined height to guarantee a sufficient angle of view when it photographs. However, as the height of the photographing unit increases, the appearance of the display apparatus becomes unattractive.

SUMMARY

Additional aspects and/or advantages will be set forth in part in the description which follows and, in part, will be apparent from the description, or may be learned by practice of the invention.

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a display apparatus which can guarantee an angle of view of a camera sufficient to photograph without spoiling an appearance of the display apparatus.

According to an aspect of an exemplary embodiment, there is provided a display apparatus which provides user interaction, the display apparatus including: a display body including an image display surface; and a photographing unit including a camera module to photograph a user to sense a user's gesture, and placed in a first position in which the photographing unit is accommodated in the display body when the photographing unit does not photograph, and placed in a second position in which the photographing unit protrudes out of the display body when the photographing unit photographs, wherein the camera module is placed closer to the image display surface when the photographing unit is placed in the second position than when the photographing unit is placed in the first position.

The photographing unit may move from the first position to the second position or from the second position to the first position, while sliding along a circular trajectory.

The display apparatus may include: a photographing unit casing having a shape corresponding to the circular trajectory and including a pair of slide guide recesses which are spaced apart from each other by a predetermined distance; and a slider connected with the photographing unit and including a pair of slide ribs which are inserted into the pair of slide guide recesses, and the slider may slide along the pair of slide guide recesses in a normal direction when the photographing unit moves from the first position to the second position, and may slide along the pair of slide guide recess in a reverse direction when the photographing unit moves from the second position to the first position.

The display apparatus may further include a locking unit configured to lock the photographing unit placed in the first position.

The locking unit may include: a locking guide path provided in the photographing unit casing, and having a locking recess formed thereon; and a latch unit sliding along the locking guide path and mounted on the slider, and, when the photographing unit is placed in the first position, the latch unit may be inserted into the locking recess of the locking guide path and may lock the photographing unit.

One end of the latch unit may be fixed to the slider and the other end of the latch unit may be inserted into the locking guide path to be movable with respect to the latch unit.

The latch unit may include: a latch body mounted on the slider; a latch lever mounted in the latch body to be movable with respect to the latch body; and a latch protrusion protruding from the latch lever and slidably inserted into the locking guide path.

The locking guide patch may have a loop configuration, and the latch unit may slide along the locking guide path in one direction.

The locking guide path may include: a first guide path formed on an inner surface of the photographing unit casing; a second guide path extending from the first guide path and guiding sliding of the latch protrusion when the photographing unit moves from the second position to the first position; a third guide path extending from the second guide path and including the locking recess; and a fourth guide path extending from the third guide path and connecting to the first guide path, thereby guiding sliding of the latch protrusion when the photographing unit moves from the first position to the second position. The first guide path, the second guide path, the third guide path, and the fourth guide path may form a loop configuration.

The third guide patch may include: a first step portion adjacent to the second guide path and having a height lower than that of the second guide path; and a second step portion adjacent to the first step portion and having a height lower than that of the first step portion, and the locking recess may be formed on a sidewall of the second step portion.

The fourth guide path may be stepped lower than the third guide path and may be stepped higher than the first guide path.

The display apparatus may further include an elastic member configured to provide a driving force to the slider so that the slider slides in the normal direction when the latch unit escapes from the locking recess, and one end of the elastic member may be fixed to the photographing unit casing and the other end of the elastic member may be supported by the slider.

The elastic member may be a torsion bar spring.

The photographing unit may be movable between the second position and a third position in which the photographing unit is placed closer to the image display surface than in the second position in order to adjust a tilt of the camera module, and the other end of the elastic member may be distanced from the slider when the photographing unit moves between the second position and the third position.

A pair of elastic pressing members may be mounted on the photographing unit casing to press the pair of slide ribs of the slider between the second position and the third position, and the pair of elastic pressing members may be in contact with the pair of slide ribs through the pair of slide guide recesses.

The display apparatus may further include a damping member disposed in the photographing unit casing to adjust a sliding speed of the slider.

The damping member may be provided as a rotary damper, and a damper rail may be provided in the slider to be engaged with the damping member so that the damping member is rotated.

The display apparatus may further include at least one voice sensing unit mounted in the display body to sense a user's voice.

The photographing unit may be made of aluminum.

The display apparatus may be a television.

According to the various exemplary embodiments as described above, the display apparatus capable of performing user interaction can guarantee an angle of view of a camera sufficient to photograph without spoiling the appearance of the display apparatus.

BRIEF DESCRIPTION OF THE DRAWINGS

These and/or other aspects and advantages will become apparent and more readily appreciated from the following description of the embodiments, taken in conjunction with the accompanying drawings of which.

The above and/or other aspects will be more apparent by describing in detail exemplary embodiments, with reference to the accompanying drawings, in which.

DETAILED DESCRIPTION

Figure 1:
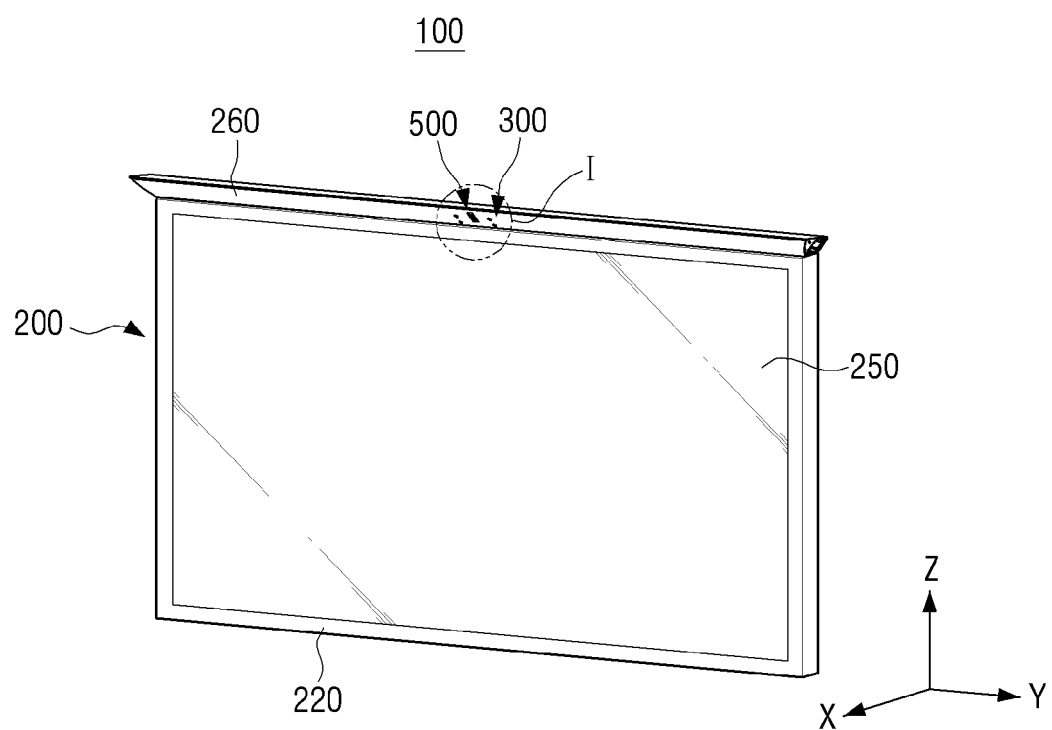
FIG. 1 is a perspective view illustrating a display apparatus when it does not photograph according to an exemplary embodiment.

Reference will now be made in detail to the embodiments, examples of which are illustrated in the accompanying drawings, wherein like reference numerals refer to the like elements throughout. The embodiments are described below to explain the present invention by referring to the figures.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

Figure 2:
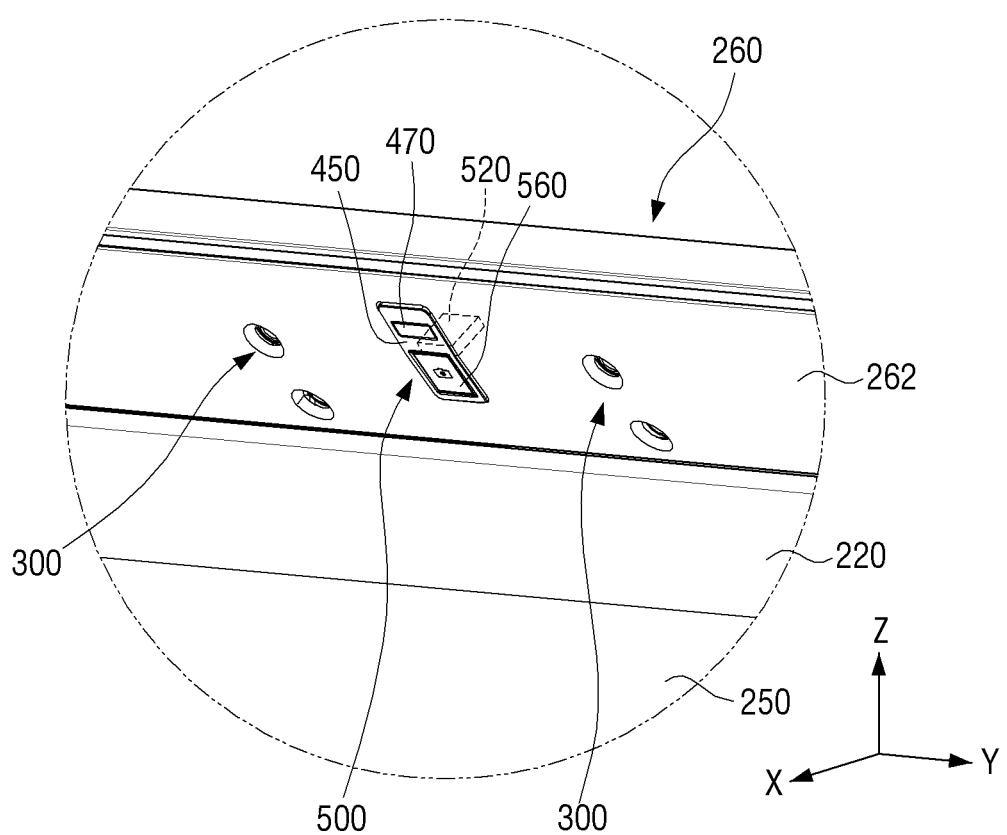
FIG. 2 is an enlarged perspective view of an area I of FIG. 1.
Figure 3:
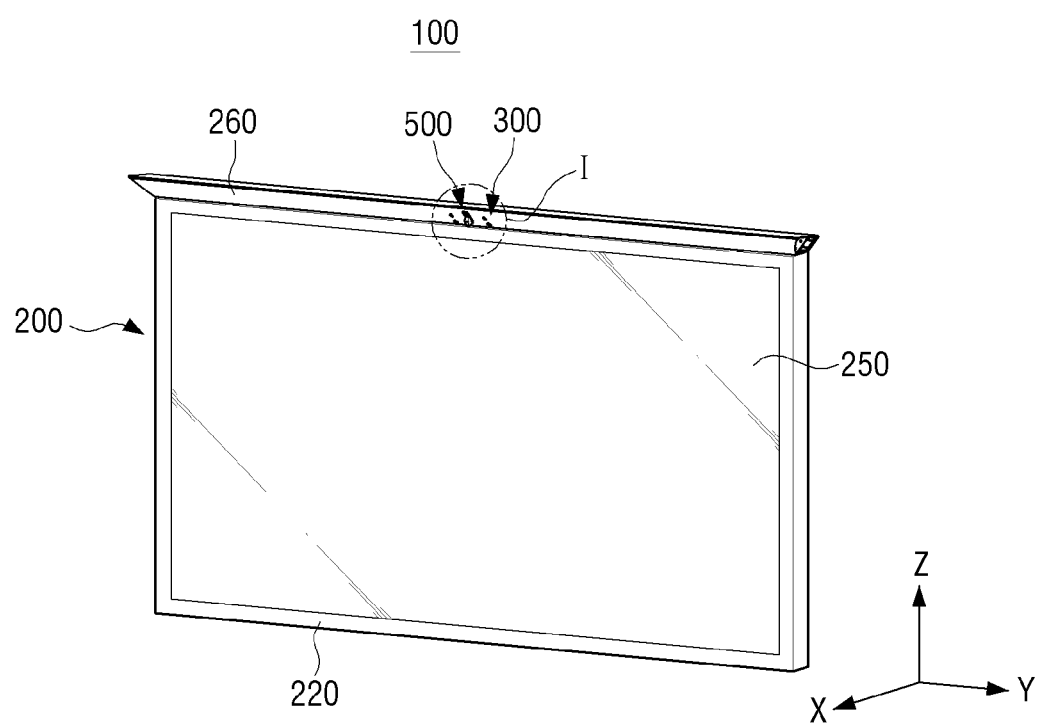
FIG. 3 is a perspective view illustrating the display apparatus of FIG. 1 when it photographs.
Figure 4:
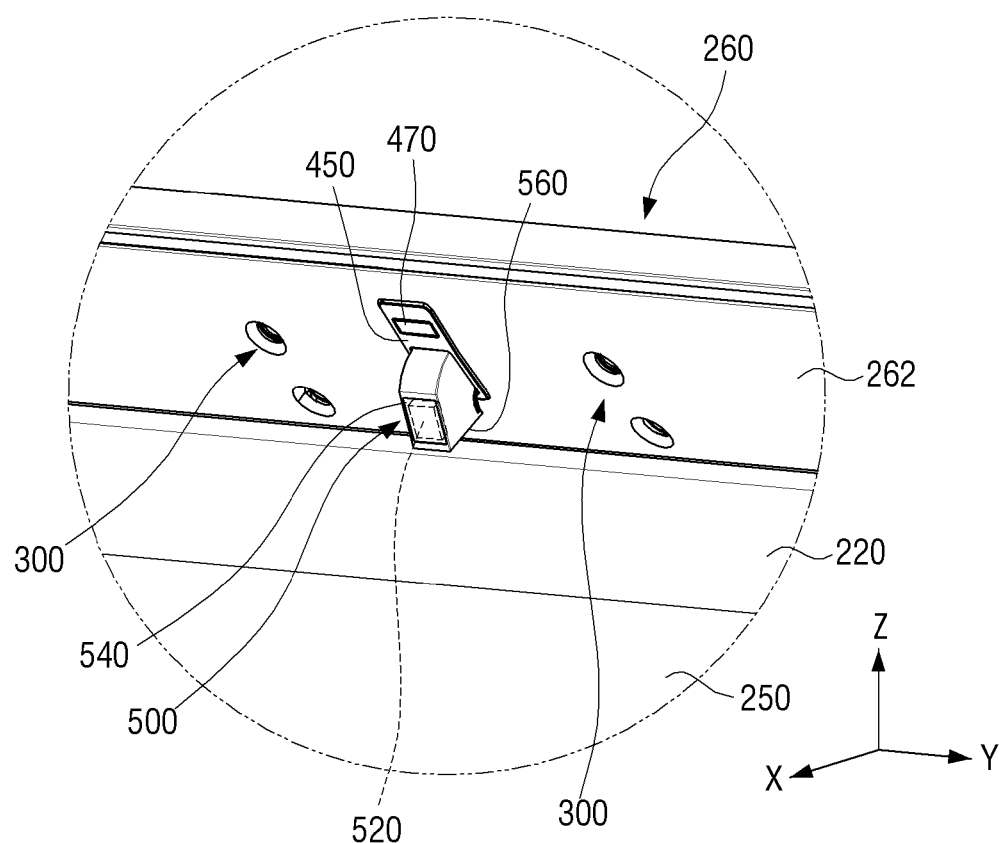
FIG. 4 is an enlarged perspective view of an area I of FIG. 3.
Figure 5:
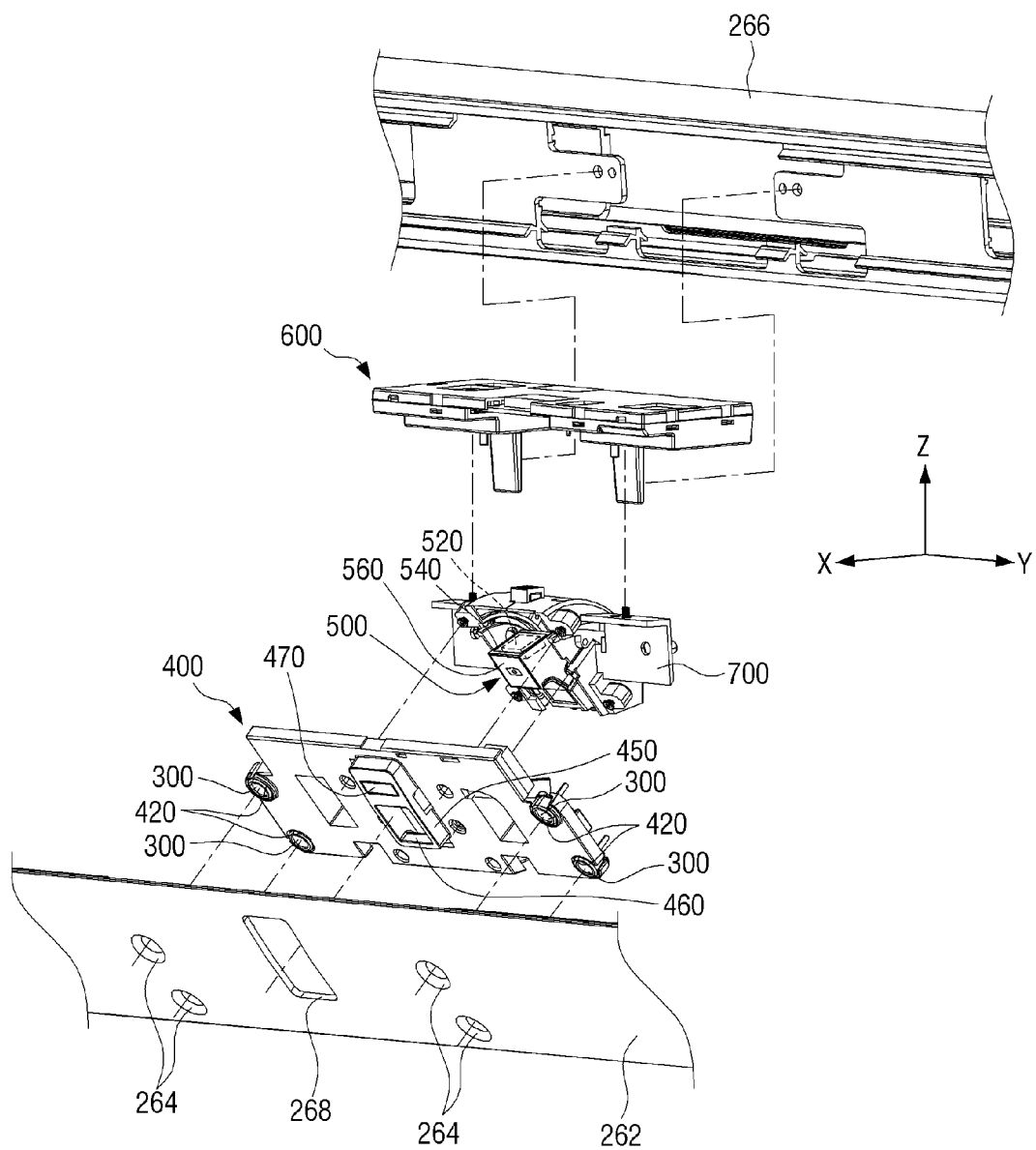
FIG. 5 is an exploded perspective view of a top casing of the display apparatus of FIG. 1.
Figure 6:
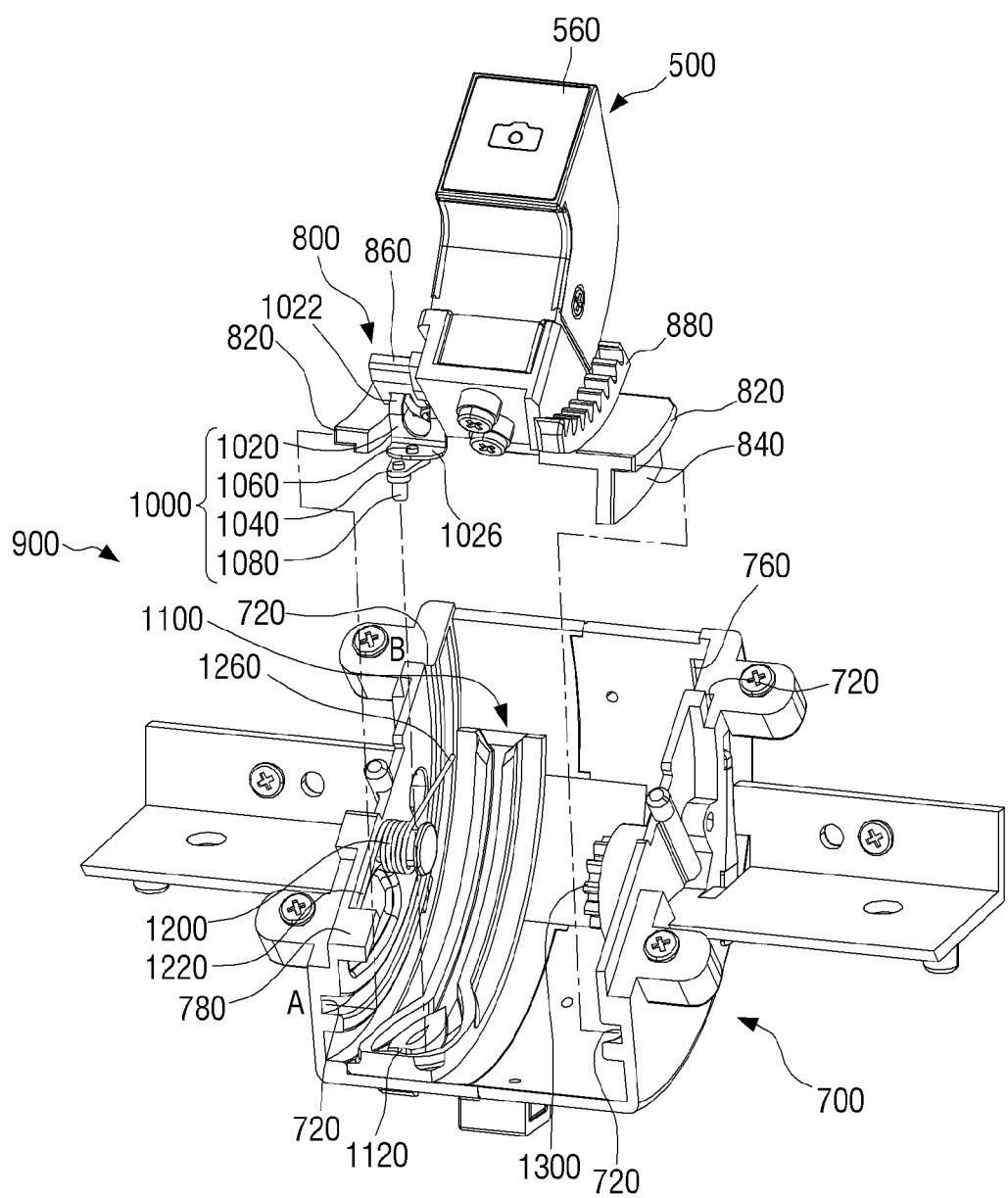
FIG. 6 is an exploded perspective view of a photographing unit and a photographing unit casing of the display apparatus of FIG. 1.

FIG. 1 is a perspective view illustrating a display apparatus when it does not photograph according to an exemplary embodiment, FIG. 2 is an enlarged perspective view of an area I of FIG. 1, FIG. 3 is a perspective view illustrating the display apparatus of FIG. 1 when it photographs, FIG. 4 is an enlarged perspective view of an area I of FIG. 3, FIG. 5 is an exploded perspective view of a top casing of the display apparatus of FIG. 1, FIG. 6 is an exploded perspective view of a photographing unit and a photographing unit casing of the display apparatus of FIG. 1.

The display apparatus 100 may sense user's various gestures or voices through user interaction, and may perform various control operations based on the sensed gesture or voice. The control operation may be changing a channel, turning up or down a volume, and executing an application, for example.

The display apparatus 100, which is a flat panel display, may be a liquid crystal display (LCD) television, a light emitting diode (LED) television, or an organic light emitting diode (OLED) television. Besides these, the display apparatus 100 may be a flat panel display of other methods, or may be a curved display or a flexible display rather than the flat panel display. Also, the display apparatus may be a computer monitor rather than the television.

The display apparatus 100 may include a display body 200, a voice sensing unit 300, and a photographing unit 500.

The display body 200 may include a main casing 220, a display panel (not shown), a control board (not shown), a power board (not shown), and an auxiliary casing 260.

The main casing 220 accommodates various parts of the display apparatus 100, such as the display panel (not shown), the control board and the power board.

The display panel is a part that displays an image and includes an image display surface 250 on which an image is displayed. The user can view various contents provided by the display apparatus 100 through the image display surface 250.

The control board may be configured to control the operation of the display apparatus 100 and may control the operation of the display apparatus 100 according to a control command which is obtained through user interaction. Also, the power board is configured to supply power to the display apparatus 100.

The auxiliary casing 260 is mounted on a top surface of the main casing 220 described above, and accommodates a voice sensing unit 300 and a photographing unit 500 therein. In the present exemplary embodiment, the auxiliary casing 260 is separately mounted on the top surface of the main casing 220. However, the auxiliary casing 260 may be integrally formed with the main casing 220.

Referring to FIG. 5, the auxiliary casing 260 includes a front casing 262 and a rear casing 266.

The front casing 262 is inclined with respect to the front (+X direction) of the display apparatus 100 (see FIG. 1). A voice sensing unit hole 264 is formed on the front casing 262 to transmit a user's voice to the voice sensing unit 300. Four voice sensing unit holes 264 are formed to correspond to four voice sensing units 300, which will be described later. A front opening 268 is formed on the front casing 262 to allow the photographing unit 500 to protrude out from the display apparatus 100 therethrough.

On the other hand, a jersey casing (not shown) may be mounted on a front surface of the front casing 262. The jersey casing covers the whole front surface of the front casing 262 except for the front opening 268. The appearance of the display apparatus 100 may be gentrified by the jersey casing.

The rear casing 266 is connected with the front casing 262 to form the top surface, side surface, and rear surface of the auxiliary casing 260. Various parts for user interaction of the display apparatus, such as the voice sensing unit 300 and the photographing unit 500, may be accommodated in a space between the front casing 262 and the rear casing 266.

The voice sensing unit 300 is an element that senses a user's voice. The voice sensing unit 300 is mounted in the auxiliary casing 260 separately from the photographing unit 500 and may be not exposed to the outside of the auxiliary casing 260. The voice sensing unit 300 may be implemented by using a microphone. In the present exemplary embodiment, four microphones are provided. However, the number of microphones will be varied.

To achieve this, the display apparatus 100 may further include a voice sensing unit casing 400.

Referring to FIG. 5, the voice sensing unit casing 400 is disposed between the front casing 262 and the photographing unit 500. A voice sensing unit mounting hole 420 is formed on the voice sensing unit casing 400 to have the voice sensing unit 300 mounted therein. Four voice sensing unit mounting holes 420 may be formed to correspond to the four microphones, respectively.

The display apparatus 100 according to the present exemplary embodiment includes the voice sensing unit 300 disposed separately from the photographing unit 500 without being integrally formed with the photographing unit 500, and thus does not require an additional space in the photographing unit 500 to accommodate the voice sensing unit 300. As such, the volume of the photographing unit 500 to be exposed to the outside may be reduced.

The voice sensing unit casing 400 includes a front protrusion 450 which protrudes out to the outside of the display apparatus 100. The front protrusion 450 passes through the front opening 268 of the front casing 262, and protrudes out from the display apparatus 100.

A photographing unit penetrating hole 460 and a remote control apparatus receiver 470 are formed in the front protrusion 450. The photographing unit 500 passes through the photographing unit penetrating hole 460 and protrude out from the display apparatus 100 when the photographing unit 500 photographs. The remote control apparatus receiver 470 receives a signal of a remote control apparatus (not shown) such as a remote controller. The remote control apparatus receiver 470 is connected to a printed circuit board (PCB) (not shown) for the remote control apparatus, which is provided in the voice sensing unit casing 400. In the present exemplary embodiment, the remote control apparatus receiver 470 is provided in the voice sensing unit casing 400. However, this is merely an example and the remote control apparatus receiver may be provided in another portion of the display apparatus if it can receive the signal of the remote control apparatus.

The photographing unit 500 to sense a user's gesture is slidably mounted in the auxiliary casing 260. Referring to FIGS. 2, 4, and 5, the photographing unit 500 includes a camera module 520.

The camera module 520 is provided in the photographing unit 500 and is an element for sensing a user's gesture. The photographing unit 500 has such a camera module 520 mounted therein, thereby sensing a user's gesture. The camera module 520 includes at least one lens (not shown) to collect light of an image, an image sensor (not shown) to convert the image into an electric signal, and an actuator (not shown) to adjust a focus by moving the lens.

The photographing unit 500 is provided with a lens protection window 540 formed ahead of the camera module 520. The lens protection window 540 is exposed to the outside of the display apparatus 100 when the photographing unit 500 photographs the user. A photographing unit push surface 560 is formed on an adjacent surface of the lens protection window 540 to be exposed to the outside of the display apparatus 100 when the photographing unit 500 does not photograph.

On the other hand, the photographing unit 500 may be made of aluminum to discharge heat generated in the camera module 520. The photographing unit 500 may be made of material other than the aluminum to discharge the heat of the photographing unit 520.

The photographing unit 500 may be accommodated in the auxiliary casing 260 when it does not photograph, and slides, passes through the photographing unit penetrating hole 460, and protrudes out from the display apparatus 100 when it photographs the user.

As shown in FIG. 2, the photographing unit 500 is placed in a first position in which the photographing unit 500 is accommodated in the auxiliary casing 260 when the photographing unit 500 does not photograph. At this time, the camera module 520 is placed to face upwards (+Z direction). By doing so, the photographing unit 500 is kept in the auxiliary casing 260 in such a manner that only the photographing unit push surface 560 is exposed to the outside as viewed from the front when the photographing unit does not photograph. Accordingly, any inconvenience that the photographing unit 500 may cause the user can be solved. Also, the appearance of the display apparatus 100 may be neatened when the photographing unit 500 does not photograph, and thus the image of a product can be gentrified.

As shown in FIG. 4, the photographing unit 500 is placed in a second position in which the photographing unit 500 protrudes out from the auxiliary casing 360 when the photographing unit 500 photographs. At this time, the camera module 520 is placed to face the front of the display apparatus 100 (+X direction). Comparing the first position (in which the photographing unit 500 is accommodated in the auxiliary casing 260), the camera module 520 is placed closer to the image display surface 250 in the second position than in the first position. Accordingly, the photographing unit 500 is not required to further protrude out from the display apparatus 100 upwardly (+Z direction) to guarantee a greater angle of view when it photographs. Therefore, the display apparatus 100 can guarantee an angle of view sufficient to photograph without spoiling the appearance of the display apparatus 100.

The display apparatus 100 further may include a PCB casing 600 and a a first controller in a PCB casing 600 (not shown).

Referring to FIG. 5, the PCB casing 600 accommodates the first controller. The PCB casing 600 is connected with the voice sensing unit 300 and the photographing unit 500 through a connection cable (not shown). Accordingly, the first controller electrically connects the voice sensing unit 300 and the photographing unit 500, respectively.

The first controller determines user interaction based on user voice information which is sensed by the voice sensing unit 300 and user gesture information which is sensed by the photographing unit 500. The first controller transmits information on the user interaction to the control board of the display apparatus 100, and a second controller of the display apparatus 100 controls the display apparatus 100 based on the information on the user interaction.

On the other hand, the first controller may not determine the user interaction based on the user voice information sensed by the voice sensing unit 300 and the user gesture information sensed by the photographing unit 500, and may directly transmit the user voice information sensed by the voice sensing unit 300 and the user gesture information sensed by the photographing unit 500 to the second controller of the display apparatus. In this case, the second controller of the display apparatus 100 may determine the user interaction based on the user voice information sensed by the voice sensing unit 300 and the user gesture information sensed by the photographing unit 500, and then may control the display apparatus 100 according to the user interaction.

Hereinafter, parts which slide between the first position of the photographing unit 500 (in which the photographing unit 500 is accommodated in the auxiliary casing 260) and the second position (in which the photographing unit 500 protrudes out from the auxiliary casing 260) will be explained in detail.

According to an aspect of the embodiments, referring to FIGS. 5 and 6, the display apparatus 100 may further include a photographing unit casing 700, a slider 800, a locking unit 900, an elastic member 1200, and a damping member 1300, so that the photographing unit 500 can slide from the first position to the second position or from the second position to the first position, while sliding along a circular trajectory.

The photographing unit casing 700 accommodates the photographing unit 500 and the slider 800 therein. A pair of slide guide recesses 720, which are spaced apart from each other by a predetermined distance, are formed on opposite inner sides of the photographing unit casing 700. The pair of slide guide recesses 720 are disposed to face each other and are formed in a form corresponding to the circular trajectory.

The slider 800 is connected with the photographing unit 500. A pair of slide ribs 820 is formed on opposite sides of the slider 800 to be inserted into the pair of slide guide recesses 720. The slider 800 slides along the pair of slide guide recesses 720 through the pair of slide ribs 820, drawing the circular trajectory in a normal direction (from A to B) when the photographing unit 500 moves from the first position to the second position. On the other hand, the slider 800 slides along the pair of slide guide recesses 720 through the pair of slide ribs 820, drawing the circular trajectory in a direction (from B to A) opposite to the normal direction (from A to B) when the photographing unit 500 moves from the second position to the first position A switching rib 840 protrudes from the slider 800 in a direction perpendicular to the slide rib 820. When the photographing unit 500 moves from the first position to the second position, the slider 800 moves in the normal direction and thus the switching rib 840 is brought into contact with a sensing switch (not shown) which is provided on the PCB casing 600 (see FIG. 6) through a switching opening 760 of the photographing unit casing 700. Accordingly, the first controller (not shown) enters a user recognition mode to sense a user gesture and a user voice. Also, when the photographing unit 500 moves from the second position to the first position, the switching rib 840 is released from the contact with the sensing switch due to the reverse direction movement of the slider 800. Accordingly, the the first controller is released from the user recognition mode.

Also, the switching rib 840 may guide smooth sliding of the slider 800 when the slider 800 slides. Since the switching rib 840 is disposed on the slide rib 720 which is formed opposite the elastic member 1200, the switching rib 840 compensates for shaking of the slide rib 720 disposed in the direction of the elastic member 1200 when the elastic member 1200 is compressed or released, such that the switching rib 840 guides smooth sliding of the pair of slide ribs 720.

The locking unit 900 is an element for locking the photographing unit 500 placed in the first position into the auxiliary casing 220. The locking unit 900 unlocks the photographing unit 500 when the photographing unit 500 is placed in the second position.

The locking unit 900 may include a latch unit 1000 and a locking guide path 1100.

The latch unit 1000 may be mounted on the slider 800. Accordingly, the latch unit 1000 is connected to the photographing unit 500 through the slider 800. The latch unit 1000 is inserted into a locking recess 1120 which is formed in the locking guide path 1100 and escape from the locking recess 1120, thereby locking and unlocking the photographing unit 500.

The latch unit 1000 may include a latch body 1020, a latch lever 1040, a hinge pin 1060, and a latch protrusion 1080.

The latch body 1020 is mounted on the slider 800 and is connected to the latch lever 1040. Specifically, the latch body 1020 has one end 1022 fixed to the slider 800 and the other end 1026 connected with the latch lever 1040.

The latch lever 1040 is in contact with a bottom surface of the other end 1026 of the latch body 1020. The hinge pin 1060 passes through the other end 1026 of the latch body 1020 and the latch lever 1040, and hinge-connects the other end 1026 of the latch body 1020 and the latch lever 1040 each other. The latch lever 1040 moves in a horizontal direction of the other end 1026 of the latch body 1020 through the hinge pin 1060.

The latch protrusion 1080 downwardly protrudes from the latch lever 1040 in a perpendicular direction. The latch protrusion 1080 is inserted into the locking guide path 1100 and slides along the locking guide path 1100 when the slider 800 moves.

The locking guide path 1100 is formed on an inner surface of the photographing unit casing 700. The locking guide path 1100 guides sliding of the latch protrusion 1080. Hereinafter, a configuration of the locking guide path 1100 will be explained in detail below with reference to FIG. 11.

Figure 11:
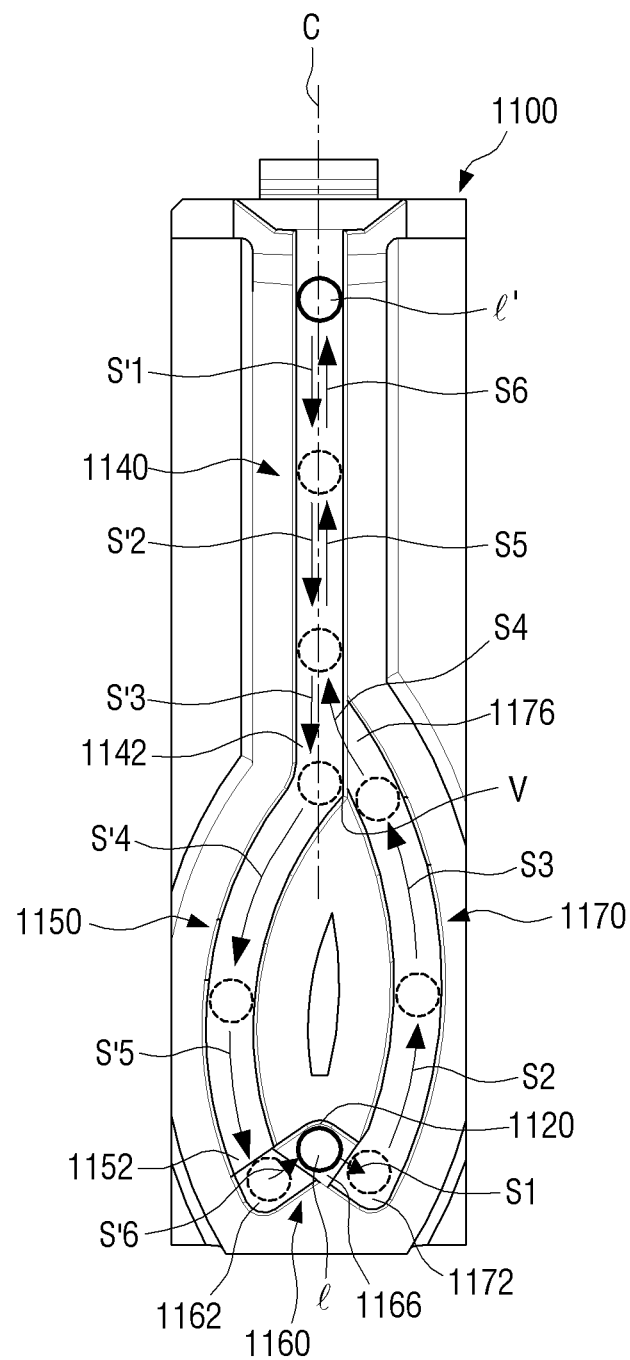
FIG. 11 is a view to illustrate an operation of a locking unit according to an exemplary embodiment.

Referring to FIG. 11, the locking guide path 1100 includes a first guide path 1140, a second guide path 1150, a third guide path 1160, and a fourth guide path 1170.

The first guide path 1140 is formed as a straight path. The second guide path 1150 is formed as a curved path and extends downstream from a lower portion 1142 of the first guide path 1140 on the left side.

The third guide path 1160 extends from the second guide path 1150 and has the locking recess 1120 formed on a sidewall thereof. The third guide path 1160 includes a first step portion 1162 and a second step portion 1166.

The first step portion 1162 is adjacent to the second guide path 1150 and has a height lower than that of the second guide path 1152. The second step portion 1166 is adjacent to the first step portion 1162 and has a height lower than that of the first step portion 1162. The locking recess 1120 described above is formed on the sidewall of the second step portion 1166.

The fourth guide path 1170 is formed as a curved path, and extends upstream from the second step portion 1166 on the right side and is connected to a lower portion 1142 of the first guide path 1140. Accordingly, the first guide path 1140, the second guide path 1150, the third guide path 1160, and the fourth guide path 1170 form a loop configuration.

A lower portion 1172 of the fourth guide path 1170 has a height lower than that of the second step portion 1166 adjacent thereto, and an upper portion 1176 of the fourth guide path 1170 has a height higher than that of the lower portion 1142 of the first guide path 1140 adjacent thereto.

Referring back to FIG. 6, the elastic member 1200 provides a driving force to the slider 800 to make the slider 800 slide in the normal direction (from A to B) when the latch protrusion 1080 of the latch unit 1000 escapes from the locking recess 1120 of the locking guide path 1100.

The elastic member 1200 has one end 1220 fixed to an elastic member fixing part 780 formed in the photographing unit casing 700, and the other end 1260 supported by an elastic member support 860 formed in the slider 800. The elastic member 1200 may be a spring, and in particular, may be a torsion bar spring in the present exemplary embodiment.

The damping member 1300 is an element for adjusting a sliding speed of the slider 800. The damping member 1300 may be mounted in the photographing unit casing 700 and may be a rotary damper. The damping member 1300 is mounted to be engaged with a damper rail 880 formed in the slider 800. Since one damping member 1300 is mounted in the photographing unit casing 700, one damper rail 880 is formed in the slider 800.

When the slider 800 slides in the normal direction (from A to B) or reverse direction (from B to A), the damping member 1300 rotates along the damper rail 880, thereby adjusting the sliding speed of the slider 800.

Hereinafter, an operation of the photographing unit 500 between the first position and the second position will be explained in detail.

Figure 7:
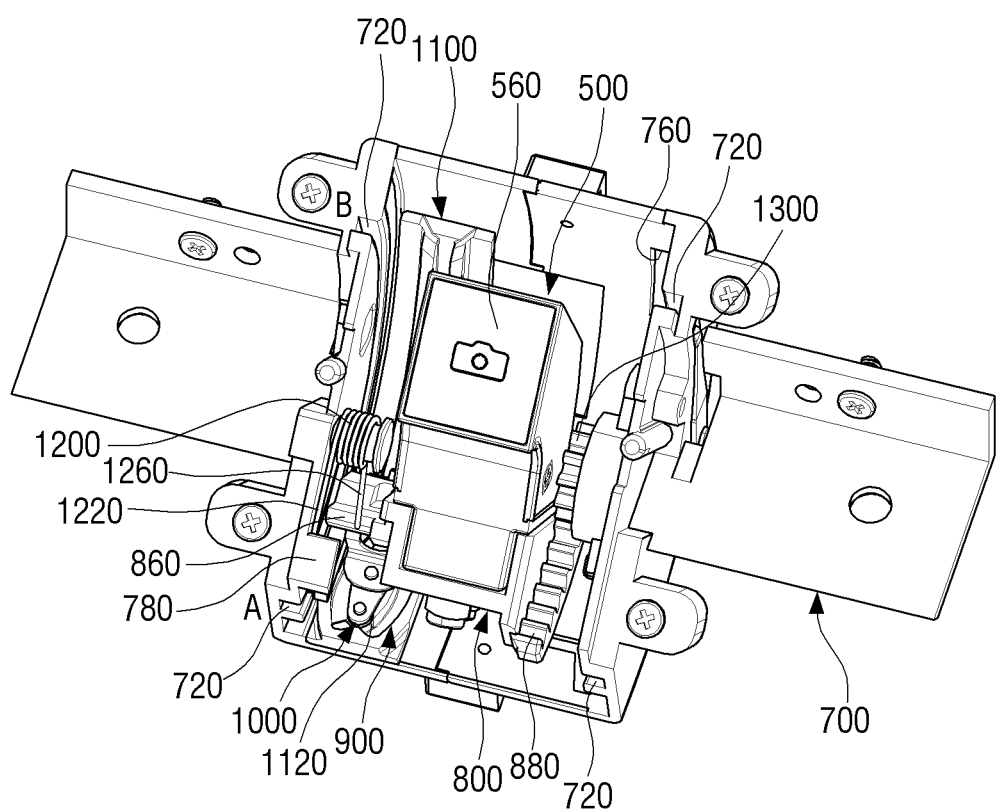
FIG. 7 is a perspective view illustrating the photographing unit when the photographing unit placed in a first position.
Figure 8:
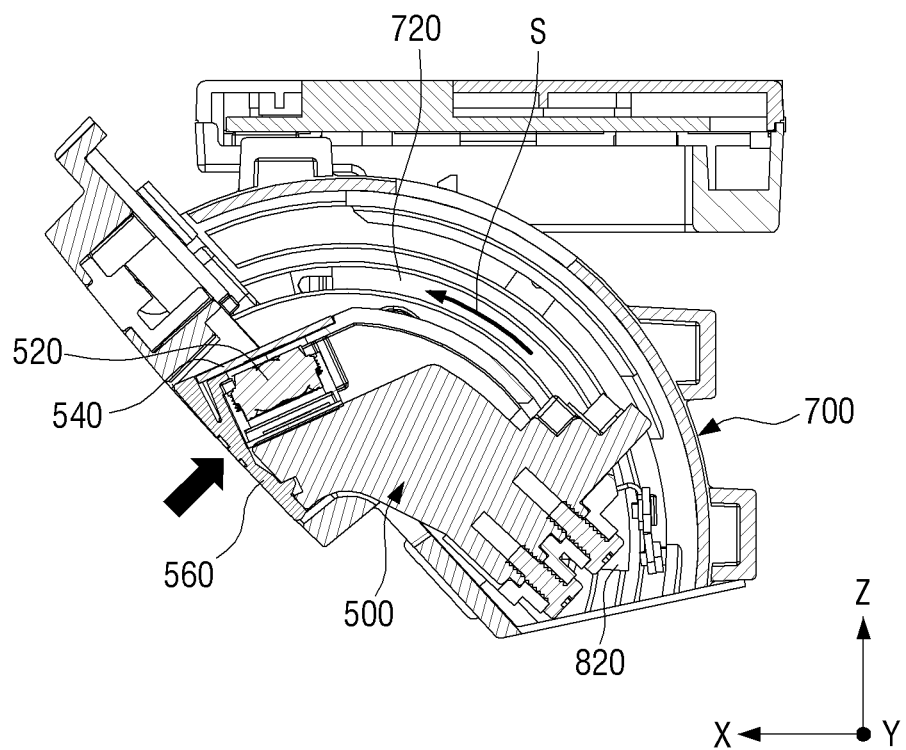
FIG. 8 is a side cross section view illustrating the photographing unit when the photographing unit is placed in the first position.
Figure 9:
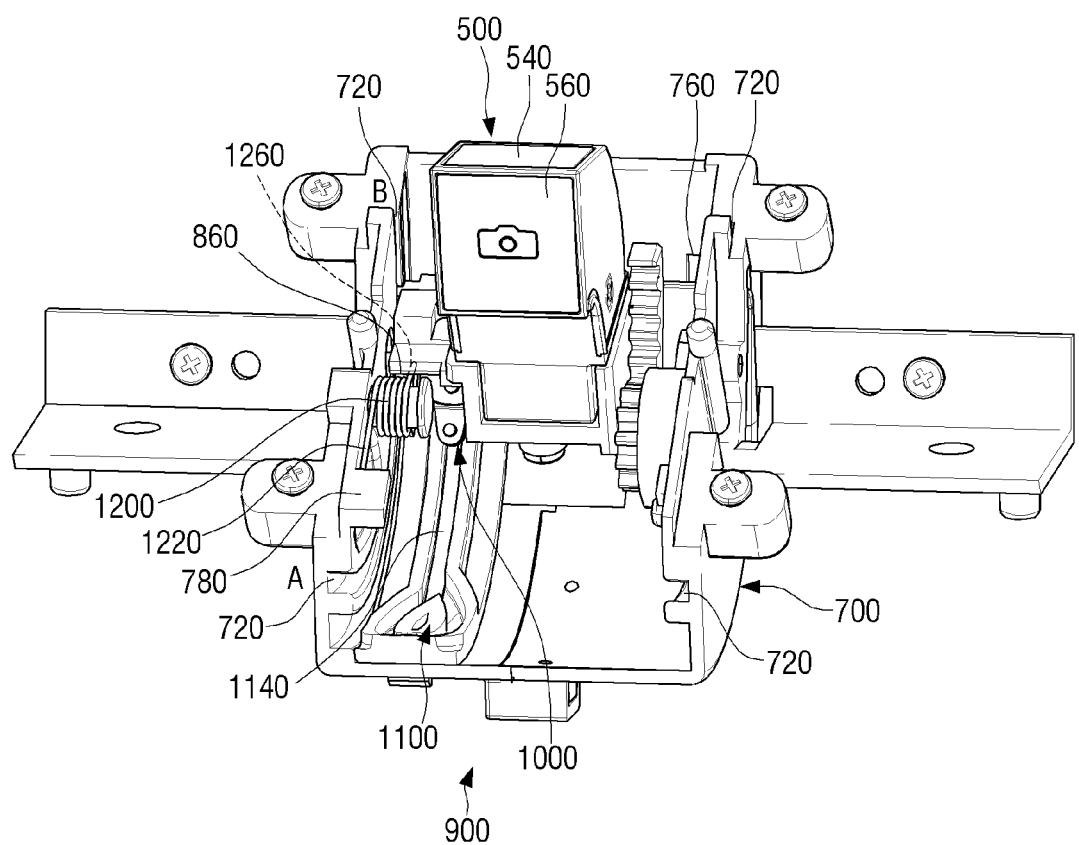
FIG. 9 is a perspective view illustrating the photographing unit when the photographing unit is placed in a second position.
Figure 10:
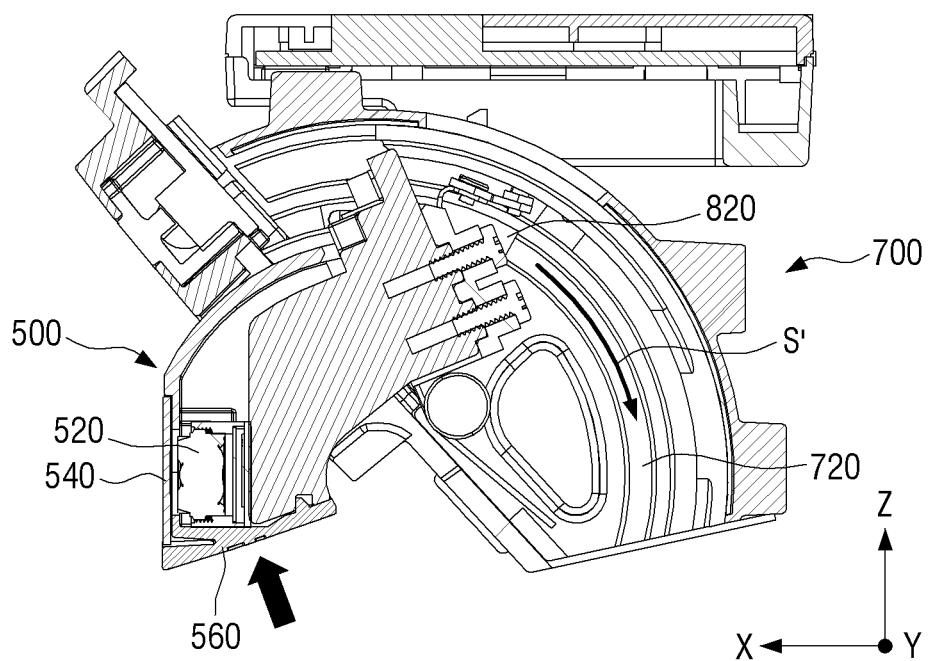
FIG. 10 is a side cross section view illustrating the photographing unit when the photographing unit is placed in the second position.

FIG. 7 is a perspective view illustrating the photographing unit when the photographing unit placed in the first position, FIG. 8 is a side cross section view illustrating the photographing unit when the photographing unit is placed in the first position, FIG. 9 is a perspective view illustrating the photographing unit when the photographing unit is placed in the second position, FIG. 10 is a side cross section view illustrating the photographing unit when the photographing unit is placed in the second position, and FIG. 11 is a view to illustrate an operation of a locking unit according to an exemplary embodiment;

Referring to FIG. 7, when the photographing unit 500 is placed in the first position (in which the photographing unit 500 is accommodated in the auxiliary casing 260), the latch protrusion 1080 (see FIG. 6) of the latch unit 1000 is inserted into the locking recess 1120 of the locking guide path 1100. At this time, the other end 1260 of the elastic member 1200 is placed in the same direction as that of one end 1220 of the elastic member 1220. This state is a state in which the elastic member 1200 is compressed and the elastic member 1200 is maintained in the compressed state when the photographing unit 500 is placed in the first position.

Referring to FIG. 8, the user presses the photographing unit push surface 560 of the photographing unit 500 which is exposed to the outside of the display apparatus 100 (see FIG. 2) when the user photographs. When the user presses the photographing unit push surface 560, the latch protrusion 1080 (see FIG. 6) of the latch unit 1000 (see FIG. 7) slides to the front of the locking recess 1120 and escapes from the locking recess 1120. At this time, the latch protrusion 1080 slides from the second step portion 1166 (see FIG. 11) to the lower portion 1172 (see FIG. 11) of the fourth guide path 1170 (see FIG. 11). This is because the height of the second step portion 1166 is lower than that of the first step portion 1162 (see FIG. 11) and is higher than that of the lower portion 1172 of the fourth guide path 1170. As a result, when the latch protrusion 1080 escapes from the locking recess 1120, the latch protrusion 1080 essentially slides to the lower portion 1170 of the fourth guide path 1170 lower than the second step portion 1166, rather than to the first step portion 1162 (see FIG. 11) higher than the second step portion 1166.

At this time, the latch lever 1040 (see FIG. 6) of the latch unit 1000 moves to the right with reference to the hinge pin 1060 (see FIG. 6) and guides the sliding of the latch protrusion 1080 to the lower portion 1172 of the fourth guide path 1170.

After that, when the user releases the photographing unit push surface 560, the elastic member 1200 is released from the compression and provides the driving force to make the slider 800 slide in the normal direction (from A to B). Accordingly, the slider 800 slides through the slide rib 820 (see FIG. 8) inserted into the slide guide recess 720 (see FIG. 8), drawing the circular trajectory S (see FIG. 8) in the normal direction, and the latch unit 1000 disposed in the slider 800 also slides up along the first guide path 1140 (see FIG. 11) through the fourth guide path 1170 (see FIG. 11).

Accordingly, the photographing unit 500 may be placed in the second position (in which the photographing unit 500 protrudes out of the auxiliary casing 260) as shown in FIG. 4, and may sense a user's gesture.

Referring to FIG. 9, when the photographing unit 500 is placed in the second position, the latch protrusion 1080 (see FIG. 6) of the latch unit 1000 is placed on the upper portion of the first guide path 1140 of the locking guide path 1100. At this time, the elastic member support 860 of the slider 800 is placed opposite the elastic member fixing part 780 with reference to the elastic member 1200. To this end, the other end 1260 of the elastic member 1200 is placed opposite one end 1220 of the elastic member 1200. Accordingly, the elastic member 1200 is released from the compression. As a result, the elastic member 1200 is maintained in a stretched state when the photographing unit 500 is placed in the second position.

Referring to FIG. 10, the user continues to press the photographing unit push surface 560 of the photographing unit 500 which is exposed to the outside of the display apparatus 100 (see FIG. 4) when the photographing unit 500 does not photograph. When the user presses the photographing unit push surface 560, the slider 800 slides through the slide rib 820 (see FIG. 10) inserted into the slide guide recess 720 (see FIG. 10), drawing the circular trajectory S (see FIG. 8) in the reverse direction (from B to A in FIG. 9).

When the slider 800 slides in the reverse direction, the elastic member support 860 of the slider 800 is placed close to the elastic member fixing part 780 of the photographing unit casing 700. To this end, the other end 1260 of the elastic member 1200 is compressed and is placed in the same direction as that of one end 1220 of the elastic member 1200. As a result, the elastic member 1200 is compressed when the slider 800 slides in the reverse direction.

Also, when the slider 800 slides in the reverse direction, the latch protrusion 1080 (see FIG. 6) of the latch unit 1000 (see FIG. 9) slides from the first guide path 1140 to the second guide path 1150. At this time, the latch protrusion 1080 slides only along the second guide path 1150 rather than the third guide path 1170. The latch protrusion 1080 slides only along the second guide path 1150 for the following reason. Referring to FIG. 11, the height of the first guide path 1140 is the same as that of the second guide path 1150. Also, the height of the first guide path 1140 is lower than that of the upper portion 1176 of the fourth guide path 1170. Also, a point V where the second guide path 1150 and the fourth guide path 1170 meet is eccentric toward the right from a center axis C of the first guide path 1140. Therefore, the latch protrusion 1080 is not allowed to slide from the first guide path 1140 to the fourth guide path 1170 and slides only to the second guide path 1150.

After that, the latch protrusion 1080 slides from the second guide path 1150 to the first step portion 1162 of the third guide path 1160. As the user presses the photographing unit push surface 560, the latch protrusion 1080 continues to be under the force in the reverse direction and thus is fixed at the first step portion 1162 without moving from the first step portion 1162 to the second step portion 1166.

After that, when the user releases the photographing unit push surface 560, the elastic member 1200 is released from the compression and provides the slider 800 with a driving force to make the slider 800 slide in the normal direction (from A to B). Accordingly, the slider 800 slides in the normal direction and the latch protrusion 1080 slides from the first step portion 1162 to the second step portion 1166 which has a lower height than that of the first step portion 1162. After that, the latch protrusion 1080 is inserted into the locking recess 1120 of the second step portion 1166 and stops sliding. When the latch protrusion 1080 stops sliding, the slider 800 also stops sliding and the elastic member 1200 is maintained in the compressed state again. As a result, the slider 800, the latch unit 1000, and the elastic member 1200 are placed as shown in FIG. 7.

Accordingly, the photographing unit 500 is placed in the first position (in which the photographing unit 500 is accommodated in the auxiliary casing 260) as shown in FIG. 2, and only the photographing unit push surface 560 is exposed to the outside of the display apparatus 100.

Hereinafter, an one-direction sliding path of the latch protrusion 1180 (see FIG. 6) caused by the loop configuration of the locking guide path 110 will be explained with reference to FIG. 11.

Referring to FIG. 11, as described above, the latch protrusion 1180 is placed on the second step portion 1166 of the third guide path 1160 in the first position (in which the photographing unit 500 is accommodated in the auxiliary casing 260; I), and is placed on the upper portion of the first guide path 1140 in the second position (in which the photographing unit 500 protrudes out of the auxiliary casing 260; I').

The latch protrusion 1180 slides between the first position (I) and the second position (I') in one direction. Specifically, when the latch protrusion 1180 moves from the first position (I) to the second position (I'), the latch protrusion 1180 moves along the second step portion 1166 of the third guide path 1160, the fourth guide path 1170, and the first guide path 1140 in the arrow direction (S1 to S6), and, when the latch protrusion 1180 moves from the second position (I') to the first position (I), the latch protrusion 1180 moves along the first guide path 1140, the second guide path 1150, the first step portion 1162 of the third guide path 1160, and the second step portion 1166 of the third guide path 1160 in the arrow direction (S'1 to S'6). As a result, the latch protrusion 1180 slides in one direction due to the loop configuration.

Hereinafter, adjusting a tilt of the camera in the display apparatus 100 according to an exemplary embodiment will be explained. The tilt refers to photographing by adjusting only an angle from top to bottom or from bottom to top with the camera being fixed. In the present exemplary embodiment, the display apparatus 100 may adjust the tilt of the camera by directly moving the photographing unit 500 exposed to the outside.

Figure 12:
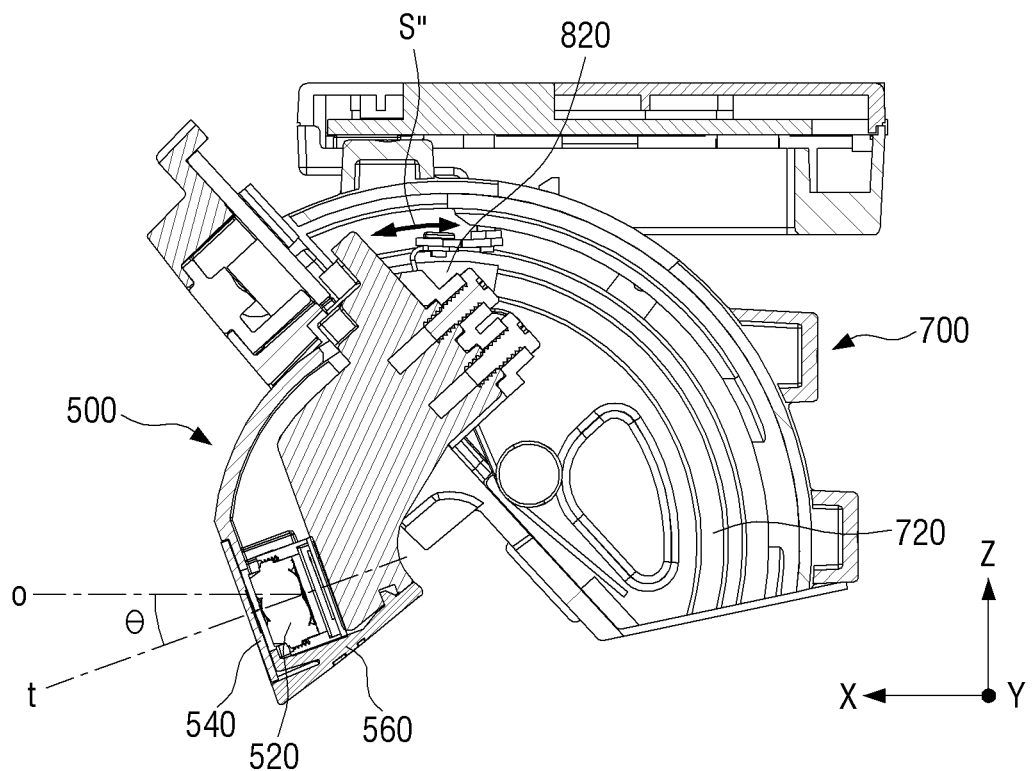
FIG. 12 is a side cross section view illustrating the photographing unit when the photographing unit is placed in a third position.
Figure 13:
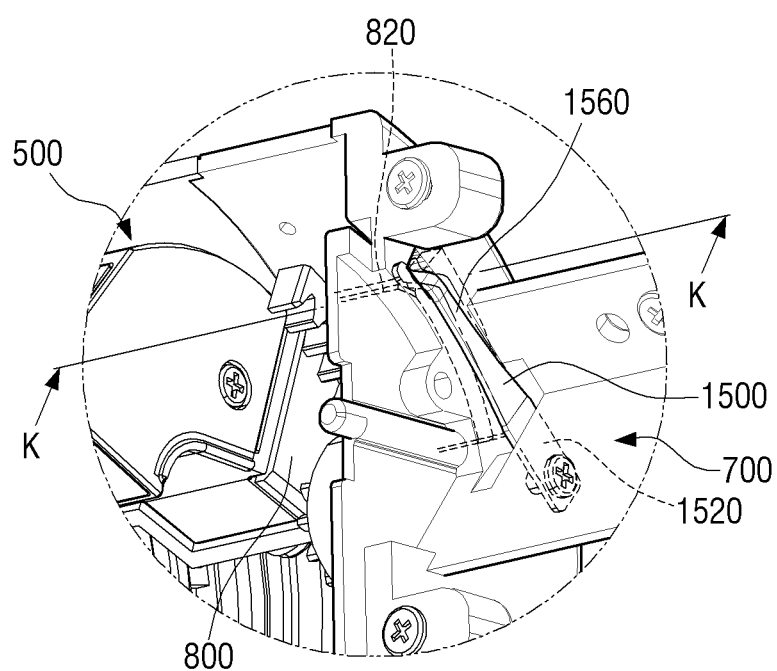
FIG. 13 is a partial perspective view illustrating the photographing unit when the photographing unit is placed in the third position.
Figure 14:
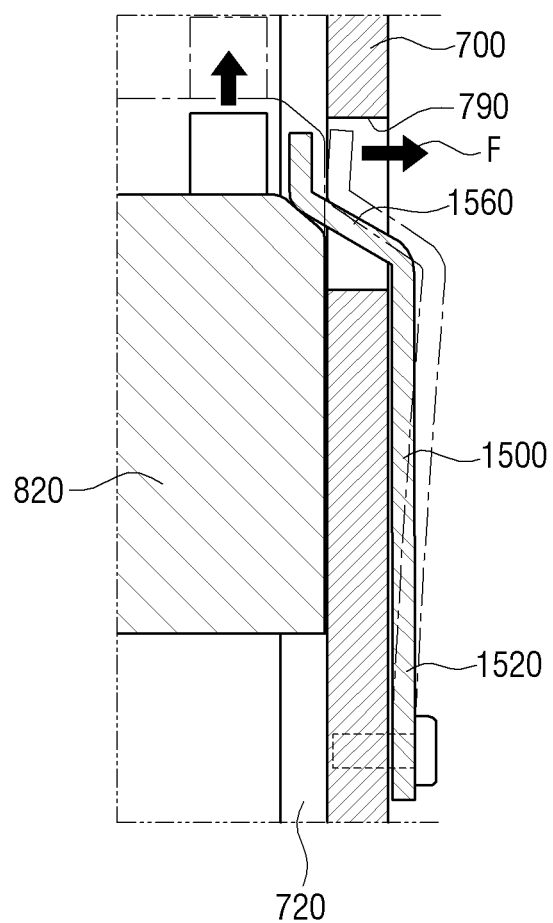
FIG. 14 is a cross section view illustrating main parts of FIG. 13.

FIG. 12 is a side section view of the photographing unit when the photographing unit is placed in a third position, FIG. 13 is a partial perspective view of the photographing unit when the photographing unit is placed in the third position, and FIG. 14 is a cross section view of main parts of FIG. 13.

Referring to FIG. 12, the user may slide up and down the photographing unit 500 with reference to the Y-axis when adjusting the tilt of the camera. Accordingly, the photographing unit 500 may move between the second position (in which the photographing unit 500 protrudes out of the auxiliary casing 260) and the third position (in which the photographing unit 500 is placed closer to the image display surface 250 (see FIG. 4) than in the second position).

When the photographing unit 500 moves between the second position and the third position, the slide rib 820 of the slider 800 slides along the slide guide recess 720 of the photographing unit casing 700, drawing the circular trajectory S".

The photographing unit 500 may move until an angle (θ) between a center axis (o) of the camera module 520 in the second position and a center axis (t) of the camera module 520 in the third position reaches 20°.

Since the display apparatus 100 according to the present exemplary embodiment tilts the photographing unit 500 when adjusting the tilt of the camera, the display apparatus 100 does not require a separate configuration or element to adjust the tilt in the photographing unit 500. Accordingly, the display apparatus 100 may have the inner configuration of the photographing unit 500 simplified. Accordingly, the display apparatus 100 according to the present exemplary embodiment may maximize the volume of the photographing unit 500 to discharge heat of the camera module 520.

Referring to FIGS. 13 and 14, the display apparatus 100 may further include an elastic pressing member 1500.

The elastic pressing member 1500 is an element for pressing the pair of slide ribs 820 of the slider 800 when the pair of slide ribs 820 slide between the second position and the third position. Therefore, a pair of elastic pressing members 1500 is provided to correspond to the pair of slide ribs 820.

One end 1520 of the elastic pressing member 1500 is fixed to the photographing unit casing 700 and the other end 1560 of the elastic pressing member 1500 is in contact with the slide rib 820 which is inserted into the slide guide recess 720 through an elastic pressing member penetrating hole 790 formed on the photographing unit casing 700. A pair of elastic pressing member penetrating holes 790 may be provided to correspond to the pair of slide ribs 820.

Referring to FIG. 14, when the slide rib 820 slides between the second position and the third position, the other end 1560 of the elastic pressing member 1500 is pushed by the slide rib 820 in the arrow direction (F). After that, the elastic pressing member 1500 continues to press the slide rib 820 in contact with the slide rib 820 in the direction opposite to the arrow direction (F). Likewise, the other elastic pressing member, which is not shown, continues to press the other slide rib. Accordingly, the pair of slide ribs 820 may slide between the second position and the second position without slipping.

On the other hand, when the pair of slide ribs 820 slide between the second position and the third position, the other end 1260 of the elastic member 1200 (see FIG. 6) leaves from the elastic member support 860 (see FIG. 6). Accordingly, when the slider 800 moves between the second position and the third position, the slider 800 does not receive the driving force from the elastic member 1200. As a result, the photographing unit 500 is moved between the second position and the third position by being manipulated by the user.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus which provides user interaction, the display apparatus comprising:
    a display body comprising an image display surface;
    a photographing unit comprising a camera module to photograph a user to sense a gesture of the user, that is placed in a first position in which the photographing unit is accommodated in the display body when the photographing unit does not photograph, and that is placed in a second position in which the photographing unit protrudes out of the display body when the photographing unit photographs,
    wherein the camera module faces upward when the photographing unit is placed in the first position, and the camera module faces a front of the display body when the photographing unit is placed in the second position,
    wherein the photographing unit moves, from the first position to the second position or from the second position to the first position, while sliding along a circular trajectory provided inside the display body.

2. The display apparatus as claimed in claim 1, further comprising:
    a photographing unit casing having a shape corresponding to the circular trajectory and comprising a pair of slide guide recesses which are spaced apart from each other by a predetermined distance; and
    a slider connected with the photographing unit and comprising a pair of slide ribs which are inserted into the pair of slide guide recesses,
    wherein the slider slides along the pair of slide guide recesses in a first direction when the photographing unit moves from the first position to the second position, and slides along the pair of slide guide recess in a reverse direction when the photographing unit moves from the second position to the first position.

3. The display apparatus as claimed in claim 2, further comprising a locking unit to lock the photographing unit placed in the first position.

4. The display apparatus as claimed in claim 3, wherein the locking unit comprises:
    a locking guide path provided in the photographing unit casing, and having a locking recess formed thereon; and
    a latch unit sliding along the locking guide path and mounted on the slider,
    wherein, when the photographing unit is placed in the first position, the latch unit is inserted into the locking recess of the locking guide path thereby locking the photographing unit.

5. The display apparatus as claimed in claim 4, wherein one end of the latch unit is fixed to the slider and the other end of the latch unit is inserted into the locking guide path to be movable with respect to the latch unit.

6. The display apparatus as claimed in claim 5, wherein the latch unit comprises:
    a latch body mounted on the slider;
    a latch lever mounted in the latch body to be movable with respect to the latch body; and
    a latch protrusion protruding from the latch lever and slidably inserted into the locking guide path.

7. The display apparatus as claimed in claim 6, wherein the locking guide patch has a loop configuration, and the latch unit slides along the locking guide path in one direction.

8. The display apparatus as claimed in claim 7, wherein the locking guide path comprises:
    a first guide path formed on an inner surface of the photographing unit casing;
    a second guide path extending from the first guide path and guiding sliding of the latch protrusion when the photographing unit moves from the second position to the first position;
    a third guide path extending from the second guide path and comprising the locking recess; and
    a fourth guide path extending from the third guide path and connecting to the first guide path, thereby guiding sliding of the latch protrusion when the photographing unit moves from the first position to the second position, wherein the first guide path, the second guide path, the third guide path, and the fourth guide path form a loop configuration.

9. The display apparatus as claimed in claim 8, wherein the third guide patch comprises:
   a first step portion adjacent to the second guide path and having a height lower than that of the second guide path; and
   a second step portion adjacent to the first step portion and having a height lower than that of the first step portion,
   wherein the locking recess is formed on a sidewall of the second step portion.

10. The display apparatus as claimed in claim 8, wherein the fourth guide path is stepped lower than the third guide path and is stepped higher than the first guide path.

11. The display apparatus as claimed in claim 4, further comprising an elastic member configured to provide a driving force to the slider so that the slider slides in the first direction when the latch unit escapes from the locking recess,
   wherein one end of the elastic member is fixed to the photographing unit casing and the other end of the elastic member is supported by the slider.

12. The display apparatus as claimed in claim 11, wherein the elastic member is a torsion bar spring.

13. The display apparatus as claimed in claim 11, wherein the photographing unit is movable between the second position and a third position in which the photographing unit is placed closer to the image display surface than in the second position in order to adjust a tilt of the camera module,
   wherein the other end of the elastic member is distanced from the slider when the photographing unit moves between the second position and the third position.

14. The display apparatus as claimed in claim 13, wherein a pair of elastic pressing members are mounted on the photographing unit casing to press the pair of slide ribs of the slider between the second position and the third position,
   wherein the pair of elastic pressing members are in contact with the pair of slide ribs through the pair of slide guide recesses.

15. The display apparatus as claimed in claim 2, further comprising a damping member disposed in the photographing unit casing to adjust a sliding speed of the slider.

16. The display apparatus as claimed in claim 15, wherein the damping member is provided as a rotary damper,
   wherein a damper rail is provided in the slider to be engaged with the damping member so that the damping member is rotated.

17. The display apparatus as claimed in claim 1, further comprising at least one voice sensing unit mounted in the display body to sense a voice of the user.

18. The display apparatus as claimed in claim 1, wherein the photographing unit is made of aluminum.

19. The display apparatus as claimed in claim 1, wherein the display apparatus is a television.

20. A display apparatus which provides user interaction, the display apparatus comprising:
   a display body comprising an image display surface; and
   a photographing unit comprising a camera module to photograph a user to sense a gesture of the user, that resides in a first position in the display body when the photographing unit does not photograph and that moves to a second position that protrudes out of the display body using a slider sliding along a circular guide provided inside the display body,
   wherein the camera module faces upwards when the photographing unit is placed in the first position, and the camera module faces a front of the display body when the photographing unit is placed in the second position.

* * * * *